US011494732B2

(12) United States Patent
Goodman et al.

(10) Patent No.: US 11,494,732 B2
(45) Date of Patent: Nov. 8, 2022

(54) NEED-BASED INVENTORY

(71) Applicant: International Business Machines Corporation, Armonk, NY (US)

(72) Inventors: Zachary James Goodman, Bedford, TX (US); Ernest Bernard Williams, Jr., Dallas, TX (US); H. Ramsey Bissex, Irving, TX (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/084,688

(22) Filed: Oct. 30, 2020

(65) Prior Publication Data
US 2022/0138670 A1    May 5, 2022

(51) Int. Cl.
*G06Q 10/08* (2012.01)
*G06Q 40/02* (2012.01)
(Continued)

(52) U.S. Cl.
CPC .......... *G06Q 10/087* (2013.01); *G06N 20/00* (2019.01); *G06Q 10/083* (2013.01);
(Continued)

(58) Field of Classification Search
None
See application file for complete search history.

(56) References Cited

U.S. PATENT DOCUMENTS 8,589,255 B2    11/2013    Glazer
10,043,317 B2    8/2018    Kline
(Continued)

FOREIGN PATENT DOCUMENTS

CN    109345337 A    2/2019
EP    2852934 B1    4/2015
(Continued)

OTHER PUBLICATIONS

Hoyer et al. "Transforming the Customer Experience Through New Technologies." Journal of Interactive Marketing, 51 (2020) 57-71. Available online May 19, 2020. Retrieved from ScienceDirect. (Year: 2020).*
(Continued)

*Primary Examiner* — Susanna M. Diaz
(74) *Attorney, Agent, or Firm* — Michael A. Petrocelli

(57) ABSTRACT

Embodiments of the present invention provide a computer system a computer program product, and a method that comprises predicting details associated with collected data of an activity by generating a simulated activity based on a result associated with a plurality of attributes within the collected data associated with the activity; simulating the activity within a virtual reality environment by generating virtual items for assistance with a performance of the simulated activity within the virtual reality environment; in response to receiving user feedback for each generated virtual item based on the simulated activity, generating a need-based inventory from user input based on an analysis of the received user feedback for each respective item associated with the simulated activity within the virtual environment; and automatically obtaining each respective item within the generated need-based inventory.

17 Claims, 5 Drawing Sheets

(51) Int. Cl.
  *G06Q 30/02* (2012.01)
  *G06Q 30/06* (2012.01)
  *G06N 20/00* (2019.01)
  *G06F 3/01* (2006.01)

(52) U.S. Cl.
  CPC ..... *G06Q 30/0202* (2013.01); *G06Q 30/0282* (2013.01); *G06Q 30/0643* (2013.01); *G06Q 40/02* (2013.01); *G06F 3/011* (2013.01)

(56) References Cited

U.S. PATENT DOCUMENTS

| | | | |
|---|---|---|---|
| 10,410,243 B2 | 9/2019 | Boal | |
| 2009/0222206 A1* | 9/2009 | Burns | G01B 5/0023 702/1 |
| 2011/0086731 A1* | 4/2011 | Todd | A63B 60/42 473/409 |
| 2013/0110670 A1* | 5/2013 | Webber | G06F 21/552 705/26.8 |
| 2013/0159141 A1* | 6/2013 | Gadiyar | G06Q 30/0641 705/26.63 |
| 2013/0246222 A1* | 9/2013 | Weerasinghe | G06F 16/951 705/26.62 |
| 2013/0335416 A1 | 12/2013 | Coon | |
| 2014/0100997 A1 | 4/2014 | Mayerle | |
| 2014/0129394 A1 | 5/2014 | Oliver | |
| 2017/0274256 A1* | 9/2017 | Brekke | A63B 60/46 |
| 2018/0005312 A1* | 1/2018 | Mattingly | G06F 3/04815 |
| 2018/0137515 A1 | 5/2018 | Higgins | |
| 2019/0228448 A1 | 7/2019 | Bleicher | |
| 2020/0004322 A1* | 1/2020 | Kudirka | G06F 3/013 |

FOREIGN PATENT DOCUMENTS

| | | | |
|---|---|---|---|
| KR | 20100074068 A * | 7/2010 | |
| WO | WO-0043936 A2 * | 7/2000 | G06Q 30/06 |

OTHER PUBLICATIONS

"La Sportiva", © 2020 La Sportiva N.A. Inc., 4 pages, <https://www.sportiva.com/>.

"Virtual Reality Market Size, Share & Industry Analysis, by Offering (Hardware, Software), by Technology (Nonimmersive, Semi-Immersive), by Industry Vertical (Gaming & Entertainment Media, Healthcare, Education, Automotive, Aerospace & Defense, Manufacturing), by Application (Training & Simulation, Educational, Attraction, Research & Development) and Regional Forecast, 2019-2026", Fortune Business Insights, Published Date: Sep. 2019, 3 pages.

* cited by examiner

NEED-BASED INVENTORY

FIELD OF INVENTION

The present invention relates generally to the field of inventory generation technology, and more specifically generating a need-based inventory based on interaction with a virtual reality environment.

BACKGROUND

Virtual reality ("VR") is a simulated experience that can be similar to or completely different from the real world. Applications of VR can include entertainment (i.e., video games) and educational purposes (i.e., medical or military training). VR may also include augmented reality or mixed reality. Generally, VR systems use either virtual reality headsets or multi-projected environments to generate realistic images, sounds, or other sensations that simulate a user's physical presence in a virtual environment. A person using VR equipment is able to look around the artificial world, move around in it, and interact with virtual features or items. The effect is commonly created by VR headsets consisting of a head-mounted display with a small screen in front of the eyes but can also be created through designed rooms with multiple large screens. Typically, VR incorporates auditory feedback and video back, but may also allow other types of sensory and force feedback through haptic technology.

Haptic technology refers to any technology that can create an experience of touch by applying forces, vibrations, or motions to the user. Haptic devices may incorporate tactile sensors that measure forces exerted by the user on the interface. Simple haptic devices are common in the form of game controllers, joysticks, and steering wheels.

SUMMARY

Embodiments of the present invention provide a computer system a computer program product, and a method that comprises predicting details associated with collected data of an activity by generating a simulated activity based on a result associated with a plurality of attributes within the collected data associated with the activity; simulating the activity within a virtual reality environment by generating virtual items for assistance with a performance of the simulated activity within the virtual reality environment; in response to receiving user feedback for each generated virtual item based on the simulated activity, generating a need-based inventory from user input based on an analysis of the received user feedback for each respective item associated with the simulated activity within the virtual environment; and automatically obtaining each respective item within the generated need-based inventory.

DETAILED DESCRIPTION

Embodiments of the present invention recognize the need for an improvement to virtual reality systems and inventory generation technology. Current VR technology does not provide a user with a way to dynamically obtain real and tangle items that were used within a VR simulation based on an interaction with the user. Generally, the user would have to use human activity (memory) to determine the effectiveness and willingness to purchase, use, and reuse an item outside of a simulated virtual environment. Currently, VR systems are used for entertainment or educational use and data collection is used to assist in the performance of the VR with continued use of a user. Typically, current VR systems maintain at least some form of a machine learning algorithm that assists with user selection, user preference, user identity, and changes in user difficulty. Embodiments of the present invention provides systems, methods, and computer program products for a solution to VR systems and inventory generation technology by providing a program that automatically obtains items based on an interaction with the simulated virtual environment and feedback from the user. Embodiments of the present invention provide an improvement on VR technologies by collecting data based on an activity, predicting various details regarding the activity, simulating the activity through VR, receiving user feedback through a haptic algorithm, generating a need-based inventory based on user feedback of the simulated activity, and automatically obtaining items generated on the need-based inventory. Embodiments of the present invention can transmit the generated need-based inventory to a user computing device, or a server computing device based on user feedback, proximity to a device, and the simulated activity within the virtual environment.

Figure 1:
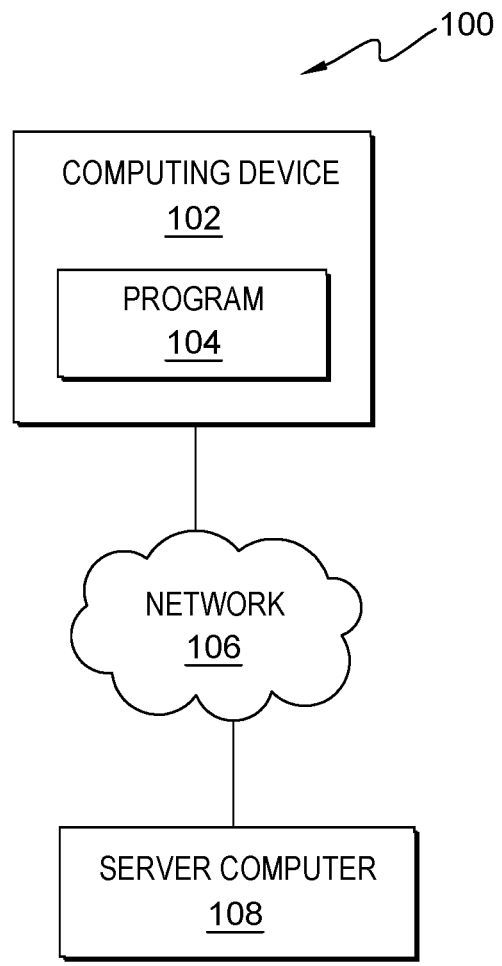
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 5.

The computing device 102 may include a program 104. The program 104 may be a stand-alone program on the computing device 102. In another embodiment, the program 104 may be stored on a server computing device 108. In this embodiment, the program 104 automatically obtains items based on an interaction with the simulated virtual environment and feedback from the user. In this embodiment, the program 104 collects data from a user regarding an activity, predicts details regarding the activity, simulates the activity through VR, receives user input in response to the simulated activity, generates an inventory from received user input, and automatically obtains items located on the generated inventory. In this embodiment, the program 104 collects data regarding an activity by manually receiving data from a user. In another embodiment, the program 104 may store pre-saved activities in the form of data from a manufacturer. In another embodiment and in the instance of an unknown action, the program 104 uses machine learning algorithms and artificial intelligence algorithms to learn new movements and activities. Examples of data that will be collected for the activity are a user's social media network data, user's calendar data, historical weather data, review from other users, and recommendations from other users. In this embodiment, the program 104 includes a mechanism to allow users to opt-in and opt-out of the data collection. In certain embodiments, the program 104 can transmit notifications to a user when data is being collected and/or otherwise being utilized. In this embodiment, the collected data is stored locally on the computing device 102. In another embodiment, the collected data is stored on a server computing device 108.

In this embodiment and in response to collecting data regarding the activity, the program 104 predicts various attributes and details regarding the activity. In this embodiment, the program 104 defines the activity as a physical action that a person or group does or has done. For example, the program 104 simulates the activity of camping, a sporting game such as baseball or basketball, and a meeting where a user interacts with a simulated activity within the virtual environment. In this embodiment, the program 104 defines various attributes as information used to generate a simulation associated with the activity. For example, the program 104 predicts the number of players need to simulate a baseball game, the weather of the activity location, the information on an agenda for discussion as details regarding the activity. In another embodiment, the program 104 may predict any accessories that the user will need for the activity. In another embodiment, the program 104 may predict related activities. In this embodiment, the program 104 defines related activities as activities that have at least two matching attributes and details as the activity. For example, kickball is a related activity to soccer due to the teams and kicking of the ball and to baseball due to the teams, bases, and rule. In another example, the program 104 determines that a board meeting is a related activity to a contract negotiation between two parties. In another example, the program 104 determines that kayaking is a related activity to paddle boarding. In this embodiment, the program 104 predicts details that are associated with the activity from the data collected from the user using a machine learning algorithm. In this embodiment, the program 104 uses the terms details and attributes interchangeably. In this embodiment and in response to predicting details of the activity, the program 104 simulates the activity through VR. In this embodiment, the program 104 generates a simulation that integrates the collected data of the activity and predicted details of the activity. In this embodiment, the program 104 transmits the generated simulation to the user through virtual reality technology. In another embodiment, the program 104 may transmit the generated simulation to the user through augmented reality technology or mixed reality technology.

In this embodiment, the program 104 subsequently receives user feedback while the user experiences the generated simulation via haptic sensors. In this embodiment and in response to transmitting the generated simulation, the user experiences a simulation of the activity. The program 104 receives input through the haptic algorithm from the user for multiple predicated details about the activity and collected data on the activity. In this embodiment, the user input is a form of user feedback, which assists the machine learning algorithm within the program 104. In this embodiment, the user input forms the inventory by allowing the user to dictate items that will be used by requiring those items within the transmitted simulation.

In this embodiment, the program 104 generates a need-based inventory based on the user interaction. In this embodiment, the program 104 generates the need-based inventory by collecting data from the user during the transmitted simulation via the haptic algorithm; analyzing the collected data using the machine learning algorithm and the artificial intelligence algorithm; adding data associated with an item when the user requests for that item during the transmitted simulation; inserting that item to the need-based inventory based on the user feedback associated with the item; and automatically obtaining a plurality of items within the need-based inventory. In this embodiment, the program 104 determines the items that the user owns that are included on the need-based inventory, orders the items that are included on the need-based inventory that are not currently owned by the user, and updates the need-based in response to receiving the ordered item. In another embodiment, the program 104 transmits a notification of items that remain on the need-based inventory after the program 104 initially obtains the items included on the need-based inventory. In another embodiment, the program 104 requires manual user input to obtain items of the need-based inventory.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106. The server computing device 108 may be a single computing device, a laptop, a cloud-based collection of computing devices, a collection of servers, and other known computing devices. In this embodiment, the server computing device 108 may be in communication with the computing device 102. In another embodiment, the server computing device 108 may be communication with the program 104. In another embodiment, the program 104 may store any collected data and pre-saved activities on the server computing device 108.

Figure 2:
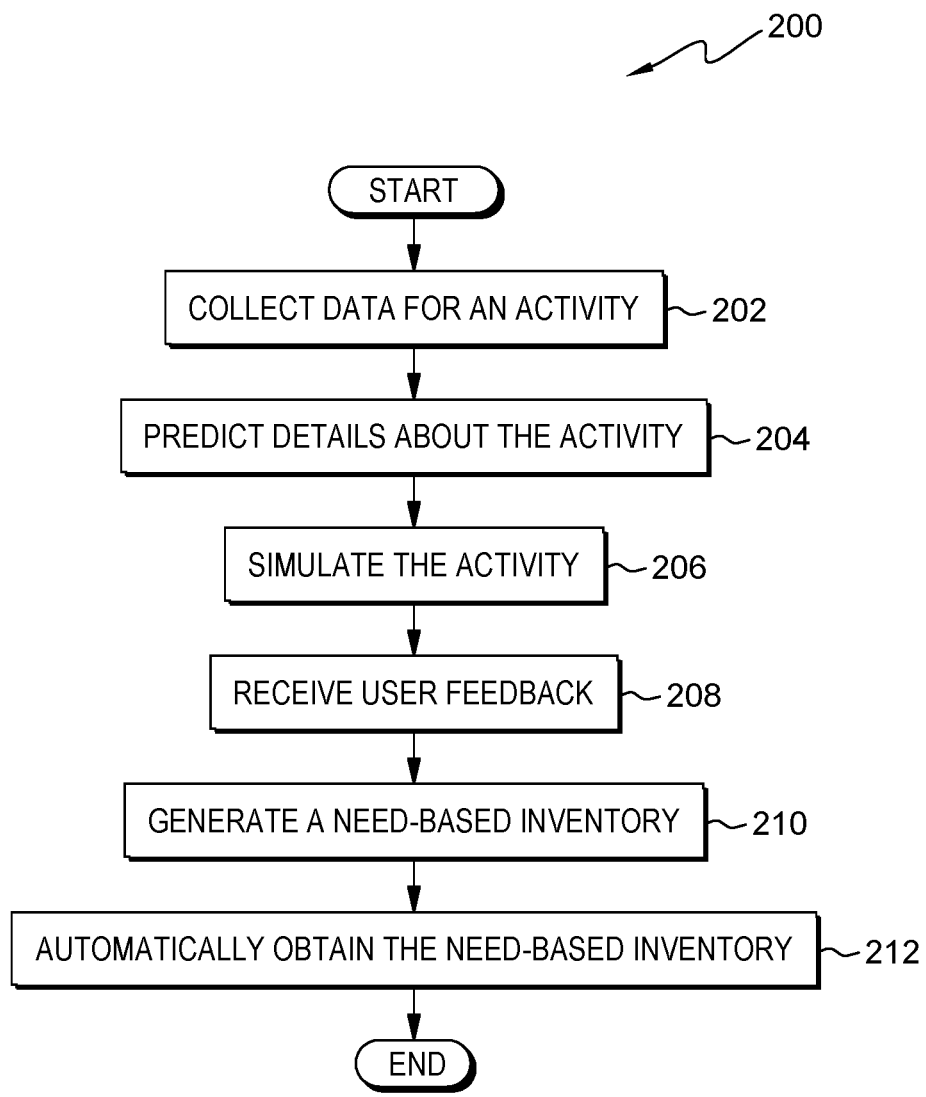
FIG. 2 is a flowchart illustrating operational steps for automatically obtaining a need-based inventory based on a user interaction with a virtual reality environment, in accordance with at least on embodiment of the present invention.

FIG. 2 is a flowchart 200 illustrating operational steps for automatically obtaining a need-based inventory based on a user interaction with a virtual reality environment.

In step 202, the program 104 collects data for an activity. In this embodiment, the program 104 the program 104 collects data for an activity by manually receiving data from a user. In this embodiment, the program 104 receives opt-in consent form a user via a mechanism, and that mechanism also allows the user to opt-out of consent. In another embodiment, the program 104 may store pre-saved activities in the form of data from a manufacturer. In another embodiment and in the instance of an unknown action, the program 104 uses machine learning algorithms and artificial intelligence algorithms to learn new movements and activities. For example, the program 104 may search and collect calendar information, specifically collects Cancun, Mexico calendar data. In another embodiment, the program 104 may store the unknown activity locally on the computing device 102. In another embodiment, the program 104 may store the manually input activity locally on the computing device 102. In another embodiment, the program 104 may store the pre-saved activities remotely on the server computing device 108. Examples of data that will be collected for the activity are a user's social media network data, user's calendar data, historical weather data, review from other users, and recommendations from other users. The program 104 collects data from a user's social media network by using a user's Internet of Things ("IoT"). For example, the program 104 collects manually input data from a user that describes a camping trip at specific park on a particular date.

In step 204, the program 104 predicts details about the activity. In this embodiment and in response to the collected data for the activity, the program 104 predicts details that relate to the collected data of the activity by analyzing the various attributes within the collected data associated with the activity, matching the various attributes within the collected data to pre-stored attributes associated with known activities, and generating a simulated activity based on a comparison of the various attributes within the collected data associated with the activity for a prediction using machine learning algorithms and artificial intelligence algorithms. In this embodiment, the program 104 predicts the population of individuals that will be near the activity location and the weather during the activity. In this embodiment, the program 104 predicts details based on a result of at least one positive match to at least one corresponding pre-stored attributes associated with the known activity. In this embodiment, the program 104 defines result as the matched plurality of attributes associated with the simulated activity. For example, the program 104 matches 4 out of 5 attributes to corresponding pre-stored attributed to generate the golf simulation. In the event that the program 104 is unable to match at least one attribute of the plurality of attributes to the corresponding pre-stored attributes, the program 104 does not generate a simulated activity. In another embodiment, the program 104 may predict an inventory based on the needs of the activity being performed. Examples of the factors of the inventory are any accessories based on the population, weather, or any other predictions of the program 104 that the user may need for the activity. In this embodiment, the program 104 uses machine learning algorithms to predict details that are associated with the activity from the data collected from the user. For example, the program 104 predicts that the user is playing tomorrow, so the program 104 predicts the weather of the golf course for tee-time, predicts the wind speed and wind direction at the course during the time the user will be playing golf, and based on the user's golf experience, predicts the user's score, which are details associated with the activity. In this embodiment, the program 104 accesses databases for any data that adds details regarding the activity, and this may include weather databases, event databases, city censuses, and other useful databases that would provide useful information that relates to the activity. For example, the program 104 predicts the weather of the camp site during the activity by reviewing the past ten years weather patterns during that week and at that location and predicts the number of campers during that week by reviewing the camp site's database. In this embodiment, the program 104 predicts a plurality of details based on a result of a positive match of at least one respective attribute to at least one corresponding pre-stored attribute within a generated simulated activity using machine learning algorithms and artificial intelligence algorithms.

In another embodiment, the program 104 may predict related activities. The program 104 considers activities related by determining details that are associated with an activity are within a predetermined threshold on a range of relatedness. The predetermined threshold is determined by a numerical scale from 1-3, where 3 is defined as being the highest related to an activity and 1 is defined as being the lowest related to the activity. The program 104 assigns a numerical value to each movement that combines to create an activity, and based on the numerical score, another activity that has a score within the predetermined threshold is related. The program 104 determines that data adds details associated with the predicted, related activity by generating a record that compiles data found for a specific activity and uses machine learning algorithms and artificial intelligence algorithms to analyze the generated record for data that relates to the activity. In this embodiment, the program 104 uses machine learning algorithms and artificial intelligence algorithms to track time for specific activities, which allows the program 104 to predict more details about the activity.

In step 206, the program 104 simulates the activity. In this embodiment and in response to collecting data and predicting details for the activity, the program 104 simulates the activity for the user to experience through virtual reality by using advanced virtual reality algorithms to generate a virtual simulation that allows the user to experience the activity and assess a needed inventory for the activity. In this embodiment, the program 104 generates a virtual item within the simulation for assistance with the activity being performed by the user. For example, the program 104 simulates a golfing activity and generates virtual clubs to assist the user to perform the golfing simulation. In another embodiment, the program 104 generates a simulation that integrates the collected data of the activity and predicted details of the activity to analyze the user's response to an exact situation based on the user's inventory needs, personality profile, lifestyle, location of the activity, and time of the activity in order to simulate the exact situation for the user to perform the activity. In another embodiment, the program 104 transmits the generated simulation to the user through virtual reality technology and augmented reality technology, which allows the user to control aspects of the simulation that the user would not be able to control in the real world. For instance, the user could speed up time, slow time down, change location, view different angles of the activity, and not feel physical sensations associated within the activity. In another embodiment, the program 104 may transmit the generated simulation to the user through augmented reality technology or mixed reality technology. For example, the program 104 simulates the entire predicted camping trip, including days, nights, rain, and foot traffic of other campers.

At step 208, the program 104 receives user feedback. In this embodiment and in response to simulating the activity, the program 104 receives user input through haptic algorithms. In this embodiment, the program 104 receives user feedback associated with each generated virtual item within the plurality of generated virtual items within the simulated activity. In this embodiment, the program 104 receives input through the haptic algorithms from the user for multiple predicted details about the activity and collected data on the activity. In this embodiment, the user input is a form of user feedback, which assists the machine learning algorithms within the program 104 learn more about the user and the activity. In this embodiment, the user input assists in the generation of a need-based inventory by allowing the user to dictate items that will be used by requiring those items within the transmitted simulation. In this embodiment, the program 104 receives input from the user in the form of request during the simulation of the activity. During the simulation, the program 104 produces these items for the user's use. For example, the program 104 receives input from the user for a tent during the camping activity, and the program 104 virtually creates a tent for the user.

In step 210, the program 104 generates a need-based inventory. In this embodiment and in response to receiving user feedback, the program 104 generates a need-based inventory from user input by analyzing the received user feedback for each respective item associated with the simulated activity within the virtual environment. In this embodiment, the program 104 generates the need-based inventory by collecting data from the user during the transmitted simulation via the haptic algorithms, analyzing the collected data for each generated item, and receiving the user feedback associated with each item. In this embodiment, the program 104 validates the user's performance of the generated simulation of the activity and determines how virtual items were used in the generated simulation for problem solving, comfortability, and satisfying a need by using haptic algorithms, advanced virtual reality algorithms, and artificial intelligence algorithms to compare a generated activity to an established baseline. This step will be further explained in FIG. 3. In this embodiment, the program 104 collects data from the user during the transmitted simulation via the haptic algorithms. For example, the program 104 collects data on the user's choice of obtaining an additional jacket during a transmitted camping simulation because the user's felt cold during the simulation. In this embodiment, the program 104 validates the user's performance by using machine learning algorithms and pattern recognition algorithms to track the user's movements during the transmitted simulation and compares those movements with movements required to perform the simulation. For example, the program 104 transmits a simulation for camping, but tracks movements from the user that indicate the user is golfing, thus the program 104 would not validate the user's performance. In this embodiment, the program 104 determines the user's use of virtual items to assist with the user to complete the performance within the transmitted simulation by analyzing the data collected using haptic algorithms, verifying the completion of the task by user, and collecting user feedback in the form of manual input from the user. For example, the program 104 determines the user used a shovel to assist with the camping simulation, verifies the user completed the task of camping, and collected feedback from the user that the shovel was helpful.

The established baseline of an activity is the pre-saved or manually input details that are needed to perform an activity. In this embodiment, the program 104 analyzes differences in the generated simulation to the established baseline and based on those differences, generates a need-based inventory to assist the user in performing the activity. The program 104 uses machine learning algorithms and artificial intelligence algorithms to analyze the differences in the collected data from the haptic algorithms and the collected data from the generated simulation. In response to the user requesting an item during the simulation, the program 104 inserts that item into an inventory; and when the user terminates the simulation, all items that are included on the inventory are converted into a single need-based inventory. For example, the program 104 received requests for a tent, a lighter, a flashlight, a sleeping bag, and a jacket; and in response to receiving those requests, the program 104 generated an inventory listing those items as needed.

In step 212, the program 104 automatically obtains the need-based inventory. In this embodiment, the program 104 determines items that the user owns that are included on the need-based inventory, orders the items that are included on the need-based inventory that are not currently owned by the user, and updates the need-based in response to receiving the ordered item. This step will be shown further in FIG. 4. In this embodiment, the program 104 determines items that the user owns by accessing the user's IoT and cross-referencing the need-based inventory with items that the user currently owns. In this embodiment, the program 104 automatically orders items using the user's IoT to electronically purchase items that are located on the need-based inventory. In this embodiment, the program 104 ensures that the electronically purchased items are sent to the correct location to be received by the user and ensures that the electronically purchased items are purchased at a time where the item will be safely shipped to a location to be received by the user. In this embodiment, the program 104 automatically updates the need-based inventory to reflect previous orders and previous receipt of items that were located on the need-based inventory. In this embodiment, the program 104 automatically removes items from the need-based inventory when the user receives the items. For example, the program 104 determined that the user owned a lighter, a flashlight, and a jacket and removed those items from the need-based inventory; but the user did not own a tent or a sleeping bag, so the program 104 automatically ordered the tent and the sleeping bag and shipped them to the user's residence. In response to the user receiving the tent and the sleeping bag, the program 104 removed the tent and the sleeping bag from the need-based inventory. In another embodiment, the program 104 transmits a notification to the computing device 102 that items remain on the need-based inventory. In another embodiment, the program 104 the program 104 transmits a notification to the computing device 102 that the need-based inventory to completed after the program 104 automatically obtains the items included on the need-based inventory. In another embodiment, the program 104 requires manual user input to obtain items of the need-based inventory.

Figure 3:
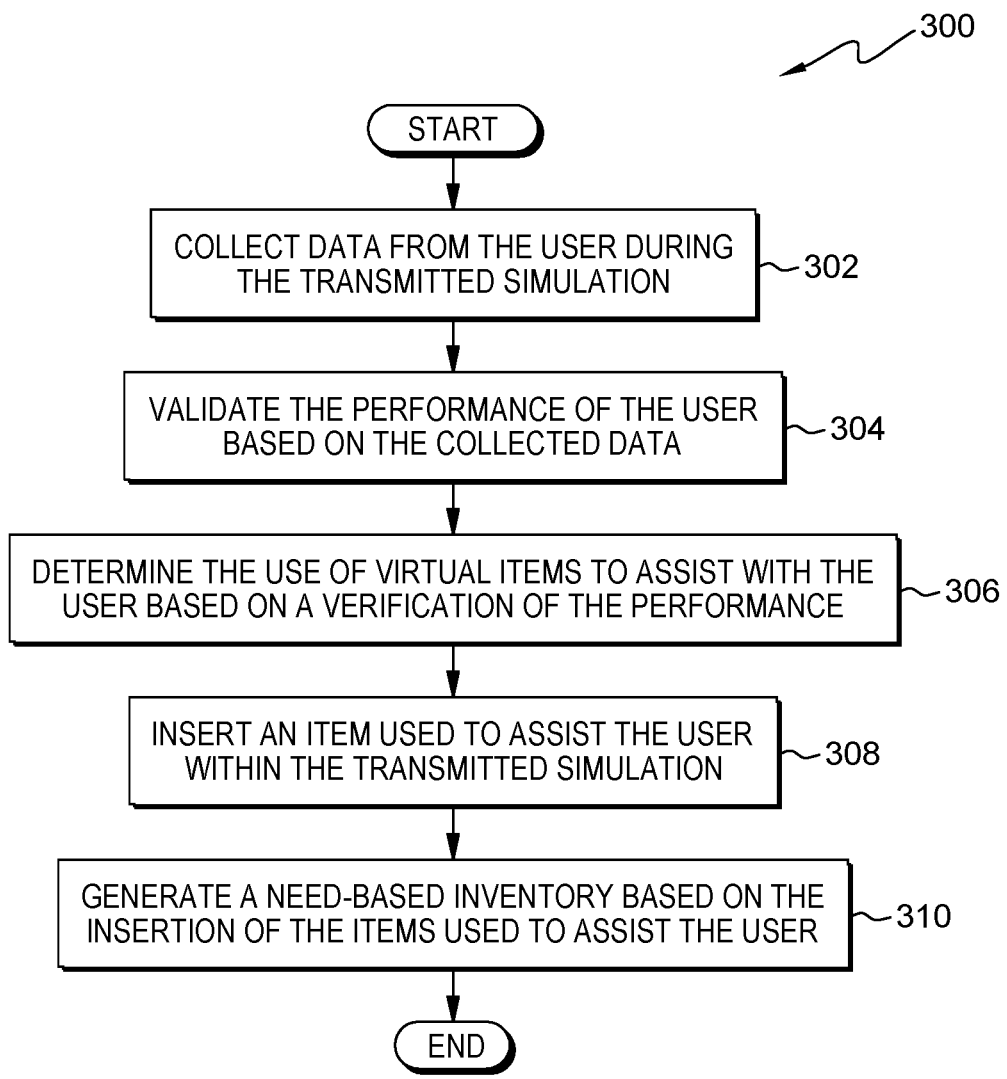
FIG. 3 is a flowchart illustrating operational steps to generate a need-based inventory, in accordance with at least one embodiment of the present invention.

FIG. 3 is a flowchart 300 illustrating operational steps to generate a need-based inventory, in accordance with at least one embodiment of the present invention.

In step 302, the program 104 collects data from the user during the transmitted simulation. In this embodiment, the program 104 collects data by observing the user using a plurality of sensor devices within the generated virtual environment. In this embodiment, the program 104 collects motion data of the user and data associated with the performance of the activity within the generated virtual environment. For example, the program 104 collects the motion of the golf swing of the user within the generated virtual environment by observing the user using motion capture sensor devices.

In step 304, the program 104 validates the performance of the user based on the collected data. In this embodiment and in response to collecting data associated with the simulated activity, the program 104 validates the performance of the user by tracking the movements of the user during the transmitted simulating using sensor devices in conjunction with machine learning algorithms and pattern recognition algorithms. In this embodiment, the program 104 tracks the movements of the user by observing the user using sensor devices that communicate data to the computing device 102. In this embodiment, the program 104 tracks the movements of the user over a fixed period of time. In another embodiment, the sensor devices communicate observational data to the program 104. In this embodiment and in response to tracking the movements of the user during the transmitted simulation, the program 104 compares the tracked movements of the user to with movements required to perform the simulation. In this embodiment and in response to the tracked movements matching the pre-stored movements required to perform the simulation, the program 104 validates the performance of the user. In another embodiment, the program 104 assesses the performance of the user associated with the simulated activity by observing the movements of the user within the virtual environment using sensor devices that communicate with the program 104.

In step 306, the program 104 determines the use of virtual items to assist with the user based on a verification of the performance within the transmitted simulation. In this embodiment, the program 104 determines the use of virtual items within the transmitted simulation by analyzing the data collected using haptic algorithms by identifying results of an assessment of the simulated activity performed by the user within virtual environment, verifying the completion of the task by the user by comparing the observed movements of the user associated with the simulated activity to a pre-stored database of movements associated with the simulated activity, and collecting user feedback in the form of manual input from the user for each virtual item used. For example, the program 104 determines the user used a driver, a nine-iron, and a putter within a golf simulation and received manual feedback that the driver performed better than the nine-iron and the putter from the driving tee.

In step 308, the program 104 inserts an item in a physical inventory based on the virtual item used to assist the user within the transmitted simulation. In this embodiment and in response to the user requesting an item during the simulation based on the determined use of virtual items, the program 104 inserts that item into the inventory based on the use of the virtual item within the simulated activity; and when the simulation is terminated, the program 104 compiles the items that are included within the inventory are converted into a single need-based inventory. For example, the program 104 inserts the driver and the nine-iron within a physical need-based inventory in response to the program 104 receiving user feedback based on these items assisting the user within the golf simulation in response to a request for each item from the user within the golf simulation.

In step 310 the program 104 generates a need-based inventory based on the insertion of the items used to assist the user within the transmitted simulation. In this embodiment, the program 104 generates the need-based inventory associated with the user based on the transmitted simulation by dynamically compiling the inserted items used to assist the user within the transmitted simulation. For example, the program 104 generates the need-based inventory by compiling the driver used within the golf simulation, the jacket from the camping simulation, and a shovel from the camping simulation into a single need-based inventory.

Figure 4:
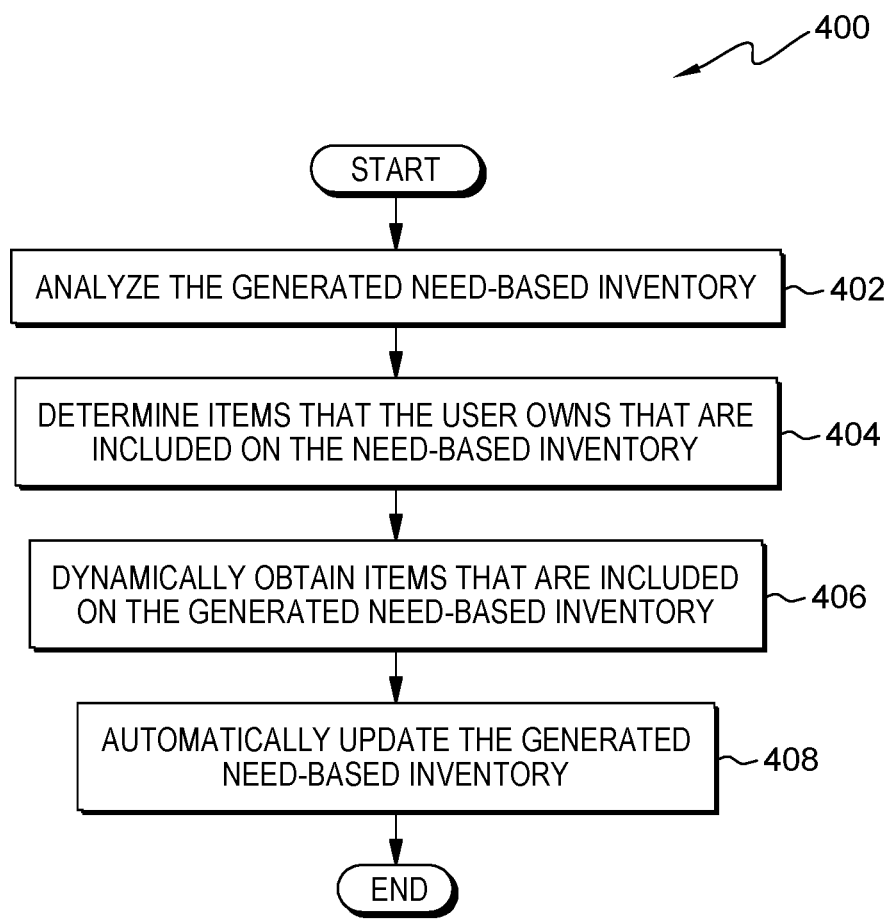
FIG. 4 is a flowchart illustrating operational steps for automatically obtaining the generated need-based inventory, in accordance with at least one embodiment of the present invention.

FIG. 4 is a flowchart 400 illustrating operational steps for automatically obtaining the generated need-based inventory.

In step 402, the program 104 analyzes the generated need-based inventory. In this embodiment, the program 104 analyzes the generated need-based inventory by identifying each item within the inventory and the transmitted simulation that the item was used by the user. In this embodiment, the program 104 analyzes the manual feedback associated with the item based on the use of item within the transmitted simulation. For example, the program 104 analyzes the generated need-based inventory for the feedback of the user associated with the driver from the golfing simulation, the jacket from the camping simulation, and the shovel from the camping simulation.

In step 404, the program 104 determines items that included on the need-based inventory that the user already owns. In this embodiment, the program 104 determines items that the user owns by analyzing the collected data and comparing the collected data to the generated need-based inventory. In this embodiment, the program 104 compares the collected data to the generated need-based inventory by matching items based on specification of the item. In this embodiment, the program 104 performs a query on an online database for additional information associated with each item within the generated need-based inventory. In this embodiment, the program 104 receives user input for a priority determination that is custom for each user in a plurality users, which may place a higher priority for price that is within a price range for a user, a specific feature that the user is looking for, or a specific color. For example, the program 104 determines that user owns the same driver in model, color, and function that is identified on the generated need-based inventory. In another example, the program 104 determines that the user owns a previous model of putter, and dynamically obtains the upgraded model of putter that is identified on the generated need-based inventory. In this embodiment, the program 104 defines the collected data as the items already purchased by the user and the typical spending pattern of the user. In this embodiment and in response to an item that is included in the generated need-based inventory matching the analysis of the collected data, the program 104 removes the item from the generated need-based inventory that matches the collected data. For example, the program 104 identifies a purchase history of a shovel within the collected data that is also located on the generated need-based inventory; and the program 104 removes the shovel from the generated need-based inventory based on the match. In this embodiment and in response to any item within the generated need-based inventory failing to match the collected data associated with the user, the program 104 retains the item within the generated need-based inventory.

In step 406, the program 104 dynamically obtains items that are included on the generated need-based inventory. In this embodiment, the program 104 dynamically orders the items that are included the generated need-based inventory that failed to match the collected data associated with the user. In this embodiment, the program 104 dynamically obtains the items that are included on the generated need-based inventory by purchasing the items using bank account information associated with the user and shipping the items to a location associated with the user. For example, the program 104 dynamically purchases the jacket and the driver that remain on the generated need-based inventory and ships them to the home of the user. In another embodiment and prior to dynamically obtaining the item that is included on the generated need-based inventory the program 104 generates a notification detailing the difference in the specifications for items that are owned but are capable of being upgraded. For example, the program 104 generates a notification detailing that the user owns driver A but driver B, which is a newer model and an upgraded version, is the driver that the program 104 would dynamically obtain in response to receiving permission from the user.

In step 408, the program 104 automatically updates the generated need-based inventory. In this embodiment and in response to dynamically obtaining items that are included on the generated need-based inventory, the program 104 updates the generated need-based inventory based on receipt of the dynamically obtained items. In this embodiment, the program 104 removes the items that are dynamically obtained from the generated need-based inventory. In this embodiment and in response to removing the dynamically obtained items, the program 104 updates the generated need-based inventory by modifying the generated need-based inventory based on a remainder of items.

Figure 5:
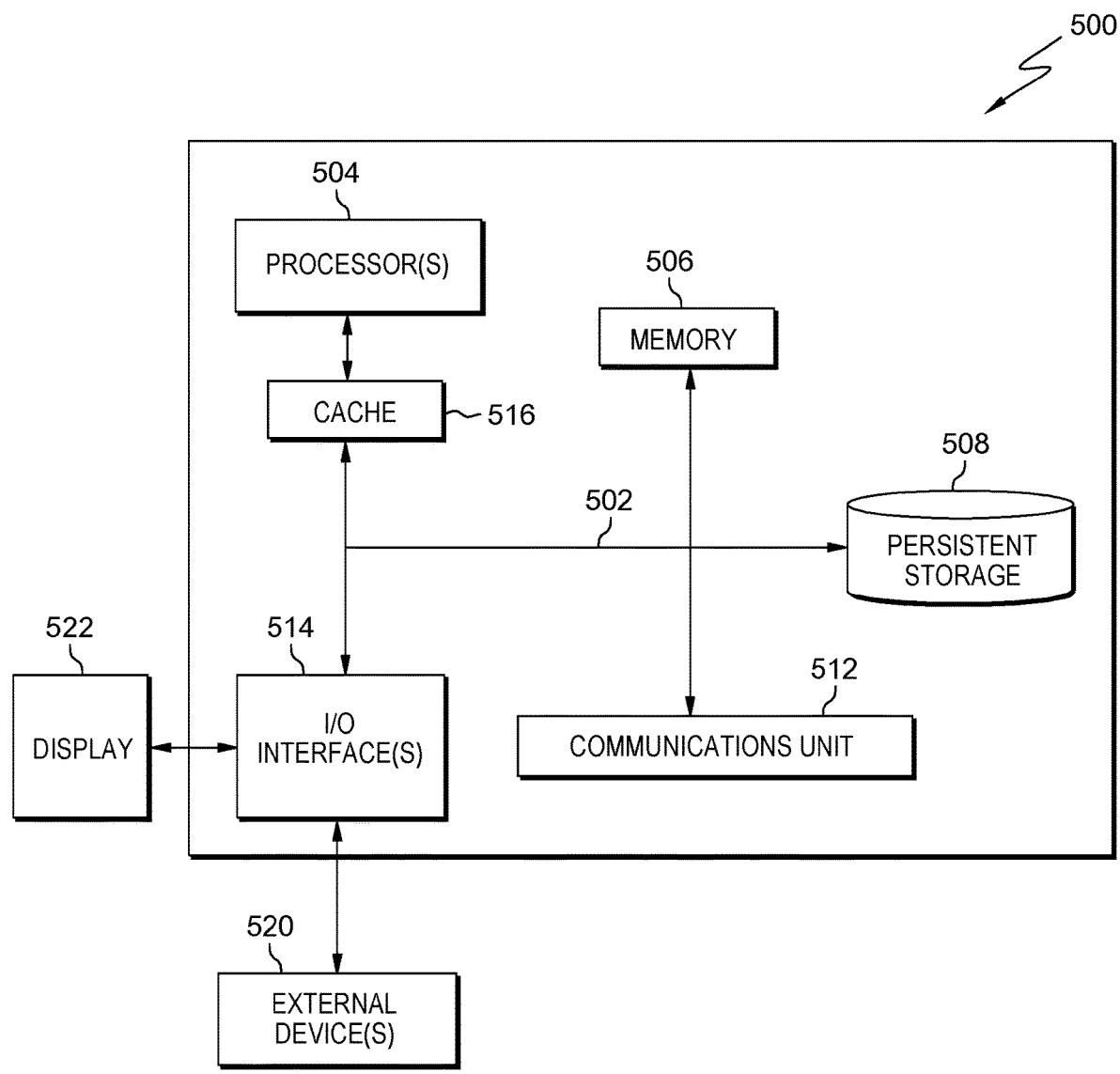
FIG. 5 depicts a block diagram of components of computing systems within a computing display environment of FIG. 1, in accordance with an embodiment of the present invention.

FIG. 5 depicts a block diagram of components of computing systems within a computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 500 includes a communications fabric 502, which provides communications between a cache 516, a memory 506, a persistent storage 508, a communications unit 512, and an input/output (I/O) interface(s) 514. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses or a crossbar switch.

The memory 506 and the persistent storage 508 are computer readable storage media. In this embodiment, the memory 506 includes random access memory (RAM). In general, the memory 506 can include any suitable volatile or non-volatile computer readable storage media. The cache 516 is a fast memory that enhances the performance of the computer processor(s) 504 by holding recently accessed data, and data near accessed data, from the memory 506.

The program 104 may be stored in the persistent storage 508 and in the memory 506 for execution by one or more of the respective computer processors 504 via the cache 516. In an embodiment, the persistent storage 508 includes a magnetic hard disk drive. Alternatively, or in addition to a magnetic hard disk drive, the persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 508 may also be removable. For example, a removable hard drive may be used for the persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. The program 104 may be downloaded to the persistent storage 508 through the communications unit 512.

The I/O interface(s) 514 allows for input and output of data with other devices that may be connected to a mobile device, an approval device, and/or the server computing device 108. For example, the I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 508 via the I/O interface(s) 514. The I/O interface(s) 514 also connect to a display 522.

The display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    matching at least one respective attribute in a plurality of attributes within collected data associated with an activity to a corresponding pre-stored attribute within a plurality of pre-stored attributes associated with a plurality of known activities;
    predicting a plurality of first details based on a result of a positive match of the at least one respective attribute to at least one corresponding pre-stored attribute within a generated simulated activity using machine learning algorithms and artificial intelligence algorithms;
    predicting a plurality of related activities by determining a plurality of second details associated with each respective related activity that are within a predetermined threshold on a range of relatedness including a numerical scale, where a largest number in the numerical scale is defined as highest related to the activity and a lowest number in the numerical scale is defined as lowest related to the activity;
    simulating the activity within a virtual reality environment by generating virtual items for assistance with a performance of the simulated activity within the virtual reality environment;
    receiving feedback from a user of the virtual reality environment while the user experiences the simulated activity via sensor devices within the generated virtual environment, the sensor devices including tactile sensors that measure forces exerted by the user on an interface;
    validating a performance of the user by tracking movements of the user during the simulated activity using the sensor devices in conjunction with machine learning algorithms and pattern recognition algorithms;

in response to receiving the user feedback and the validated performance of the user for each generated virtual item based on the simulated activity, generating a need-based inventory from user input based on an analysis of the received user feedback for each respective item associated with the simulated activity within the virtual environment;

automatically obtaining each respective item within the generated need-based inventory;

automatically updating the generated need-based inventory in response to automatically obtaining each respective item within the generated need-based inventory; and by a program of a computing device, accessing an IoT of the user and cross-referencing the need-based inventory with items currently owned by the user and the program automatically and electronically purchasing, using the IoT of the user, at least one item located on the need-based inventory and not currently owned by the user.

2. The computer-implemented method of claim 1, further comprising collecting data for the activity by:

learning movements of a user by observing the user over a fixed period of time using the sensor devices; and determining a pattern associated with the user based on an analysis of the learned movements associated with the user.

3. The computer-implemented of claim 1, further comprising:

determining that data adds details associated with the predicted related activity by generating a record that compiles data found for a specific activity;

using machine learning algorithms and artificial intelligence algorithms to analyze the generated record for data that relates to the activity; and using machine learning algorithms and artificial intelligence algorithms to track time for the specific activity and predict more details about the activity.

4. The computer-implemented method of claim 1, wherein simulating the activity within the virtual reality environment comprises:

generating a virtual simulation that allows a user to experience the activity; and generating a virtual item in response to a request for the virtual item by the user.

5. The computer-implemented method of claim 1, wherein generating the need-based inventory comprises:

validating a performance of a user by tracking movements of the user during the simulated activity using the sensor devices in conjunction with machine learning algorithms and pattern recognition algorithms;

determining use of virtual items to assist with the performance of the user based on a validation of the performance within the simulated activity;

inserting an item into an inventory associated with the user based on the determination of the use of the virtual item to assist with the performance of the user within the simulated activity; and generating the need-based inventory associated with the user based on the simulated activity by dynamically compiling the inserted items of the inventory associated with the user used to assist with the performance of the user within the simulated activity.

6. The computer-implemented method of claim 1, wherein automatically obtaining each respective item within the generated need-based inventory comprises:

analyzing the generated need-based inventory by identifying each respective item within the generated need-based inventory;

determining items within the generated need-based inventory that a user owns based on the analysis of the generated need-based inventory, the collected data, and a comparison of the collected data to the analysis of the generated need-based inventory;

dynamically obtaining the items that are included on the generated need-based inventory by purchasing the items using bank account information associated with the user and shipping the items to a location associated with the user; and automatically updating the generated need-based inventory in response to dynamically obtaining the items that are included on the generated need-based inventory.

7. A computer program product comprising:

one or more computer readable storage media and program instructions stored on the one or more computer readable storage media, the program instructions comprising:

program instructions to match at least one respective attribute in a plurality of attributes within collected data associated with an activity to a corresponding pre-stored attribute within a plurality of pre-stored attributes associated with a plurality of known activities;

program instructions to predict a plurality of first details based on a result of a positive match of the at least one respective attribute to at least one corresponding pre-stored attribute within a generated simulated activity using machine learning algorithms and artificial intelligence algorithms;

program instructions to predict a plurality of related activities by determining a plurality of second details associated with each respective related activity that are within a predetermined threshold on a range of relatedness including a numerical scale, where a largest number in the numerical scale is defined as highest related to the activity and a lowest number in the numerical scale is defined as lowest related to the activity;

program instructions to simulate the activity within a virtual reality environment by generating virtual items for assistance with a performance of the simulated activity within the virtual reality environment;

program instructions to receive feedback from a user of the virtual reality environment while the user experiences the simulated activity via sensor devices within the generated virtual environment, the sensor devices including tactile sensors that measure forces exerted by the user on an interface;

program instructions to validate a performance of the user by tracking movements of the user during the simulated activity using the sensor devices in conjunction with machine learning algorithms and pattern recognition algorithms;

in response to receiving the user feedback and the validated performance of the user for each generated virtual item based on the simulated activity, program instructions to generate a need-based inventory from user input based on an analysis of the received user feedback for each respective item associated with the simulated activity within the virtual environment;

program instructions to automatically obtain each respective item within the generated need-based inventory;

program instructions to automatically update the generated need-based inventory in response to automatically obtaining each respective item within the generated need-based inventory; and by a program of a computing device, program instructions to access an IoT of the user and cross-referencing the need-based inventory with items currently owned by the user and the program automatically and electronically purchasing, using the IoT of the user, at least one item located on the need-based inventory and not currently owned by the user.

8. The computer program product of claim 7, wherein the program instructions stored on the one or more computer readable storage media further comprise:

program instructions to collect data for the activity by:

program instructions to learn movements of a user by observing the user over a fixed period of time using the sensor devices; and program instructions to determine a pattern associated with the user based on an analysis of the learned movements associated with the user.

9. The computer program product of claim 7, further comprising:

program instructions to determine that data adds details associated with the predicted related activity by generating a record that compiles data found for a specific activity;

program instructions to use machine learning algorithms and artificial intelligence algorithms to analyze the generated record for data that relates to the activity; and program instructions to use machine learning algorithms and artificial intelligence algorithms to track time for the specific activity and predict more details about the activity.

10. The computer program product of claim 7, wherein the program instructions to simulate the activity within the virtual reality environment comprise:

program instructions to generate a virtual simulation that allows a user to experience the activity; and program instructions to generate a virtual item in response to a request for the virtual item by the user.

11. The computer program product of claim 7, wherein the program instructions to generate a need-based inventory comprise:

program instructions to validate a performance of a user by tracking movements of the user during the simulated activity using the sensor devices in conjunction with machine learning algorithms and pattern recognition algorithms;

program instructions to determine use of virtual items to assist with the performance of the user based on a validation of the performance within the simulated activity;

program instructions to insert an item into an inventory associated with the user based on the determination of the use of the virtual item to assist with the performance of the user within the simulated activity; and program instructions to generate the need-based inventory associated with the user based on the simulated activity by dynamically compiling the inserted items of the inventory associated with the user used to assist with the performance of the user within the simulated activity.

12. The computer program product of claim 7, wherein the program instructions to automatically obtain each respective item within the generated need-based inventory comprise:

program instructions to analyze the generated need-based inventory by identifying each respective item within the generated need-based inventory;

program instructions to determine items within the generated need-based inventory that a user owns based on the analysis of the generated need-based inventory, the collected data, and a comparison of the collected data to the analysis of the generated need-based inventory;

program instructions to dynamically obtain the items that are included on the generated need-based inventory by purchasing the items using bank account information associated with the user and shipping the items to a location associated with the user; and program instructions to automatically update the generated need-based inventory in response to dynamically obtaining the items that are included on the generated need-based inventory.

13. A computer system comprising:

one or more computer processors;

one or more computer readable storage media; and program instructions stored on the one or more computer readable storage media for execution by at least one of the one or more processors, the program instructions comprising:

program instructions to match at least one respective attribute in a plurality of attributes within collected data associated with an activity to a corresponding pre-stored attribute within a plurality of pre-stored attributes associated with a plurality of known activities;

program instructions to predict a plurality of first details based on a result of a positive match of the at least one respective attribute to at least one corresponding pre-stored attribute within a generated simulated activity using machine learning algorithms and artificial intelligence algorithms;

program instructions to predict a plurality of related activities by determining a plurality of second details associated with each respective related activity that are within a predetermined threshold on a range of relatedness including a numerical scale, where a largest number in the numerical scale is defined as highest related to the activity and a lowest number in the numerical scale is defined as lowest related to the activity;

program instructions to simulate the activity within a virtual reality environment by generating virtual items for assistance with a performance of the simulated activity within the virtual reality environment;

program instructions to receive feedback from a user of the virtual reality environment while the user experiences the simulated activity via sensor devices within the generated virtual environment, the sensor devices including tactile sensors that measure forces exerted by the user on an interface;

program instructions to validate a performance of the user by tracking movements of the user during the simulated activity using the sensor devices in conjunction with machine learning algorithms and pattern recognition algorithms;

in response to receiving the user feedback and the validated performance of the user for each generated virtual item based on the simulated activity, program instructions to generate a need-based inventory from user input based on an analysis of the received user feedback for each respective item associated with the simulated activity within the virtual environment;

program instructions to automatically obtain each respective item within the generated need-based inventory;

program instructions to automatically update the generated need-based inventory in response to automatically obtaining each respective item within the generated need-based inventory; and by a program of a computing device, program instructions to access an IoT of the user and cross-referencing the need-based inventory with items currently owned by the user and the program automatically and electronically purchasing, using the IoT of the user, at least one item located on the need-based inventory and not currently owned by the user.

14. The computer system of claim 13, wherein the program instructions stored on the one or more computer readable storage media further comprise:

program instructions to collect data for the activity by:

program instructions to learn movements of a user by observing the user over a fixed period of time using the sensor devices; and program instructions to determine a pattern associated with the user based on an analysis of the learned movements associated with the user.

15. The computer system of claim 13, further comprising:

program instructions to determine that data adds details associated with the predicted related activity by generating a record that compiles data found for a specific activity;

program instructions to use machine learning algorithms and artificial intelligence algorithms to analyze the generated record for data that relates to the activity; and program instructions to use machine learning algorithms and artificial intelligence algorithms to track time for the specific activity and predict more details about the activity.

16. The computer system of claim 13, wherein the program instructions to simulate the activity within the virtual reality environment comprise:

program instructions to generate a virtual simulation that allows a user to experience the activity; and program instructions to generate a virtual item in response to a request for the virtual item by the user.

17. The computer system of claim 13, wherein the program instructions to generate a need-based inventory comprise:

program instructions to validate a performance of a user by tracking movements of the user during the simulated activity using the sensor devices in conjunction with machine learning algorithms and pattern recognition algorithms;

program instructions to determine use of virtual items to assist with the performance of the user based on a validation of the performance within the simulated activity;

program instructions to insert an item into an inventory associated with the user based on the determination of the use of the virtual item to assist with the performance of the user within the simulated activity; and program instructions to generate the need-based inventory associated with the user based on the simulated activity by dynamically compiling the inserted items of the inventory associated with the user used to assist with the performance of the user within the simulated activity.

\* \* \* \* \*